United States Patent [19]
DiFillipo

[11] Patent Number: 6,134,828
[45] Date of Patent: Oct. 24, 2000

[54] HEADSTONE PLANTER

[76] Inventor: Leonard V. DiFillipo, P.O. Box 12, Merrimack, N.H. 03054

[21] Appl. No.: 09/382,839

[22] Filed: Aug. 25, 1999

[51] Int. Cl.⁷ .................................................. A01G 5/00
[52] U.S. Cl. .............................. 47/41.01; 47/39; 47/66.1; 248/27.8
[58] Field of Search .................. D11/143–145, D11/152–156; 47/18 R, 39, 40, 41 R, 41.01, 41.11, 41.12, 41.13, 66, 68, 86; 248/231.4, 214, 311.2; 108/47; 403/306; 52/125, 137, 136, 124, 79; 27/30

[56] References Cited

U.S. PATENT DOCUMENTS

| | | | |
|---|---|---|---|
| 1,133,836 | 3/1915 | Bolger | 47/66.1 |
| 2,659,180 | 11/1953 | Acton | 47/81 |
| 2,815,606 | 12/1957 | Quackenbush | 47/41.12 |
| 3,269,555 | 8/1966 | Henderson | 211/86.01 |
| 4,640,045 | 2/1987 | Nesbitt et al. | 47/66 |
| 4,722,160 | 2/1988 | Davis | 47/41.1 |
| 5,072,542 | 12/1991 | Quackenbush | 47/41.01 |
| 5,368,266 | 11/1994 | Allen | 248/231.4 |

*Primary Examiner*—Michael J. Carone
*Assistant Examiner*—Francis T. Palo
*Attorney, Agent, or Firm*—Robert R Debault, Esq.; Mesmer Law Offices, P.A.

[57] ABSTRACT

A headstone planter that has four walls and a concave bottom for securing plants and flowers atop a headstone. The four walls and concave bottom form a notched base that allows the planter to securely rest atop a variety of differently shaped headstones. The notched base accommodates round or flat headstones having either smooth or rough cut surfaces. The planter has drain openings in the bottom and rounded top edges.

17 Claims, 2 Drawing Sheets

HEADSTONE PLANTER

BACKGROUND OF THE INVENTION

1. Field of the Invention

The present invention relates generally to an apparatus and method for displaying graveside adornment, such as flowers, memorial decorations and the like, atop grave marking stones. Particularly, this invention relates to a removable adornment planter that may be mounted on a variety of grave marking stones without damaging or marking the stone.

2. Description of the Related Art

Headstones, also typically referred to as tombstones or gravestones, come in a variety of shapes, sizes and surfaces. It is customary to place flowers or other decorations adjacent to or on headstones or other grave markers. Cemetery groundskeepers find that memorials placed on the ground near a grave become obstacles which are difficult to maneuver around while mowing and trimming. Consequently, cemeteries have promulgated rules that require decorations placed on the ground, such as flowers, plants, plastic flowers and the like, to be removed prior to the days that mowing and trimming is to occur. Persons placing such decorations near a grave typically wish for them to be displayed as long as possible, sometimes even permanently, and are greatly inconvenienced by the need to return to the grave site to remove such decorations periodically.

Present methods of displaying flowers and other adornment objects out of the way of the cemetery groundskeepers include such complex mechanisms as the combination grave marker and flower receptacle shown in U.S. Pat. No. 4,1722,160 (1988, C. Davis). Davis discloses a grave marker which has a cover on its top face that can be opened to expose a flower receptacle. This cover, when not being used to display flowers, can be folded down and out of the way, thereby allowing for easy maintenance around the grave marker, or even over the grave marker if it is mounted flush with the ground. Regardless of which position the cover is in, this grave marker does not interfere with normal cemetery maintenance.

Another device to keep grave site adornments off the ground is disclosed in U.S. Pat. No. 4,640,045 (1987, R. Nesbitt et al). This patent discloses a saddle that has been adapted to be clamped to the top portion of a headstone. A holding structure, such as a planter box, is then attached to the saddle and decorative objects can be displayed out of the way of lawnmowers or other cemetery trimming machines.

U.S. Pat. No. 5,072,542 (1991, D. Quackenbush) discloses another type of saddle planter adapted to be mounted on a gravestone. This saddle planter is attached to the gravestone by brackets with cushioned legs that are designed to supply forces to the front and rear of the gravestone, thereby holding the saddle planter in place while also preventing scratching and marking of the gravestone. Containers of various sizes can be attached to this saddle planter so that the size of the floral display can be enlarged.

An adjustable saddle which can be used on either grave markers or porch deck railings is disclosed in U.S. Pat. No. 5,368,266 (1994, N. Allen). This adjustable saddle is secured on the top of a grave marker or porch deck railing by spring-mounted opposing pairs of legs. Decorative objects, such as a planter box, can then be attached to the saddle and ornamental objects can be displayed.

What is needed is a planter that is capable of being used on a variety of differently shaped grave stone markers. What is also needed is a planter that has no moving parts, won't damage the headstone and is readily removable from the headstone. What is further needed is a device that will stand up to long term continual use and be conducive to growing plant life.

SUMMARY OF THE INVENTION

The present invention relates to a planter which provides a container conducive to growing plant life that can be securely set atop a wide variety of headstones. The planter is composed of a bottom, two end walls and two side walls all permanently joined together at their interfaces by a means such as welding, fusing, brazing, gluing, bonding, soldering, or the like. The walls and bottom may be joined together along their entire interfaces, or may be spot joined as in the preferred embodiment of the present invention. The top edges of all walls are rounded outwardly so as to be conducive to growing plant life. The outwardly rounded portion of the front side wall can have holes drilled, punched or cut into it so a nameplate can be hung from the holes. The front side wall can have a hook either punched out of or welded onto its outside face so adornments such as wreaths, bows or the like may be hung on the front of the planter. The bottom ends of both side walls and both end walls are a concave shape when viewed in their upright position so as to seat securely on headstones with tops that are rounded, flat or otherwise shaped. The end walls are shorter than the side walls so that when the rounded top portions of the end walls are aligned to be approximately one-half inch lower than the rounded top portions of the side walls, a notch is formed where the bottom of the shorter end walls meet approximately one-half inch above the bottom of the taller side walls. Drain holes may be cut, punched, or otherwise formed into the bottom of the planter to allow excess water to drain out of the planter. The planter can be made of any material, such as plastic, painted metal or the like, which can withstand years of continuous use exposed to the elements and that will not scratch or damage the headstone.

It is therefore an object of the present invention to provide an apparatus and method for securing plants and flowers to a variety of differently shaped grave stone markers.

It is also an object of the present invention to provide a planter that has no moving parts, that won't damage the headstone and that is configured so it is readily removable.

Finally, it is an object of the present invention to provide a durable, long lasting device that will withstand years of continuous use with little or no maintenance and that will help to protect the stems of plants and flowers planted within its interior.

These objects are achieved by providing a planter that securely rests atop a headstone, that is preferably constructed of a steel or other long lasting material, that has a long lasting coating or paint designed to withstand years of exposure to a variety of weather conditions, that has rounded or curved edges and that allows excess water within the planter to drain away thereby benefiting the plant life within the planter.

Further objects and advantages of this invention will be more clearly apparent during the course of the following description, references being made to the accompanying drawings which illustrate a preferred form of the device of the invention and wherein like characters of reference designate like parts throughout the drawings.

DETAILED DESCRIPTION OF THE PREFERRED EMBODIMENT

Figure 1:
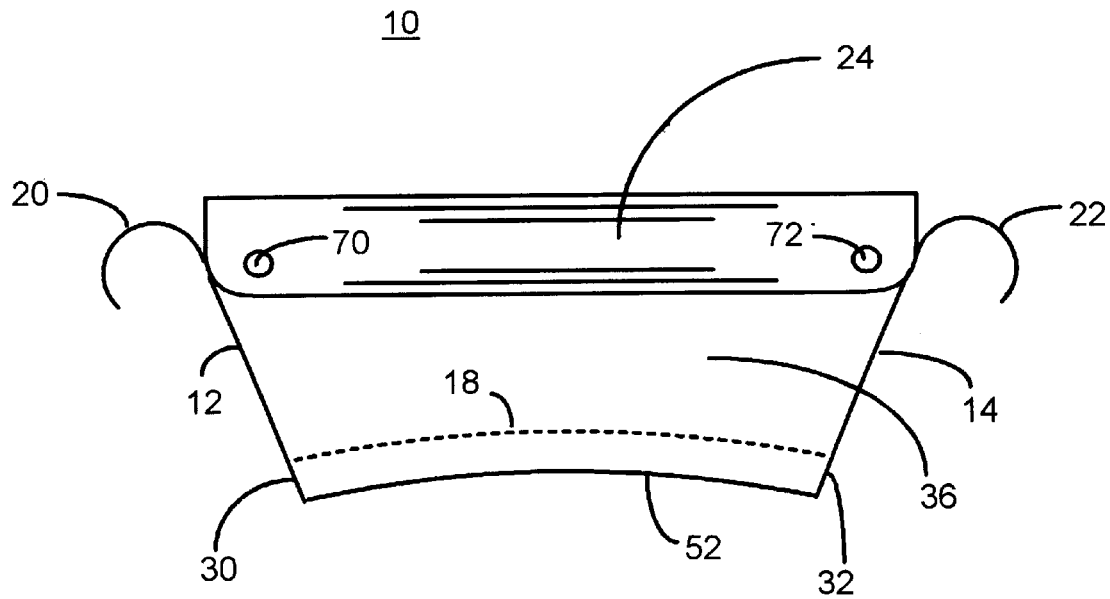
FIG. 1 is a side view of a preferred embodiment of the planter device showing the general shape of the planter device, the rounded top portions of all walls and the location and shape of the concave bottom relative to the side walls.
Figure 2:
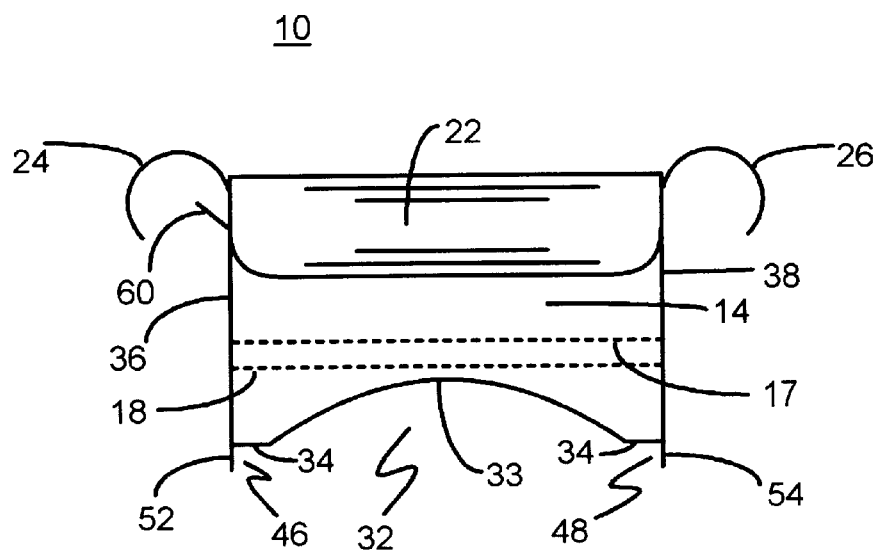
FIG. 2 is an end view of the planter device showing the notch formed where the bottom ends of the shorter end walls meet slightly above the bottom ends of the taller side walls.
Figure 3:
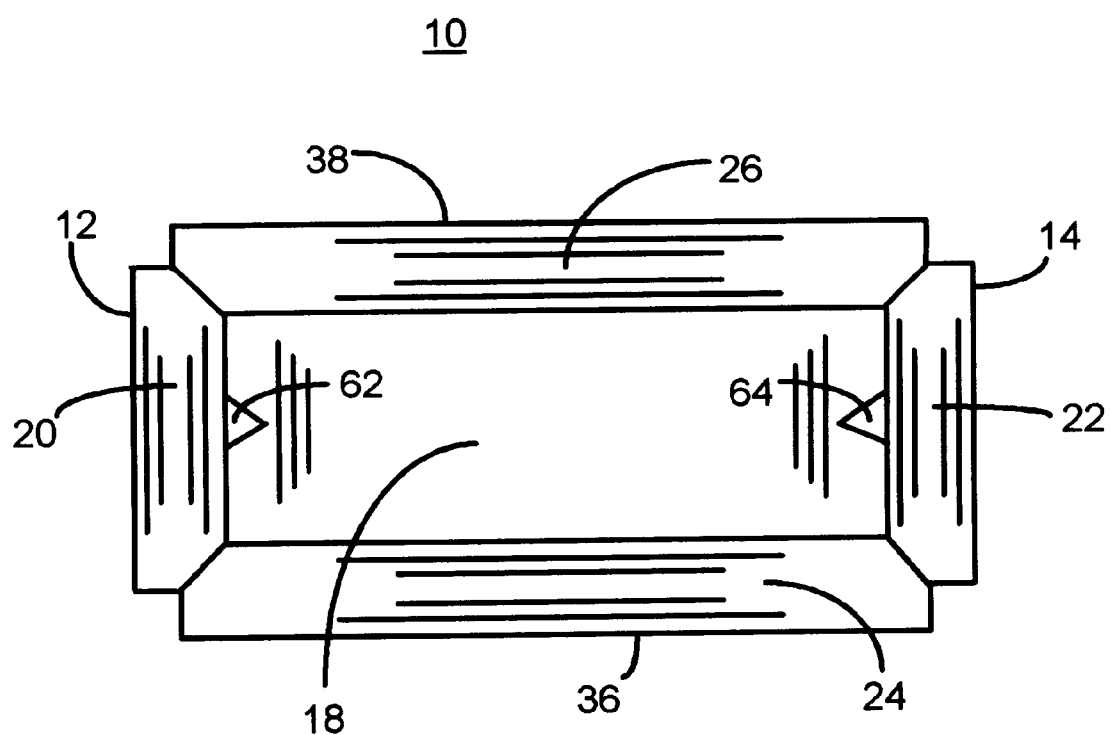
FIG. 3 is a top view of the planter device showing the rounded top portions of all walls and the drain holes in the concave bottom as viewed when looking into the planter device from the top.

For the purposes of promoting an understanding of the principles of the invention, references will now be made to the preferred embodiment of the present invention as illustrated in FIGS. 1–3, and specific language used to describe the same. It will nevertheless be understood that no limitation of the scope of the invention is thereby intended. The terminology used herein is for the purpose of description and not limitation. Any modifications or variations in the depicted method or device, and such further applications of the principles of the invention as illustrated therein, as would normally occur to one skilled in the art to which the invention relates are considered to be within the spirit of the invention.

Referring now to FIG. 1, there is shown a side view of headstone planter 10 as seen when looking at the headstone planter from the front. In the preferred embodiment of this invention, headstone planter 10 is made of metal that, once completely assembled, is then coated with a corrosion-resistant film. Headstone planter 10 may also be made of other materials such as plastic, or may be coated with other corrosion-resistant materials such as textured or non-textured corrosion-resistant paint that can withstand years of continuous use exposed to the elements. Headstone planter 10 has a first end wall 12, a second end wall 14, a front side wall 36, a back side wall 38 (not shown) and a curved bottom 18 which are manually cut, plasma cut or punched to their desired shape and all edges are deburred. First end wall 12 has a rounded top portion 20 and a bottom end 30. After first end wall 12 is manually cut, plasma cut or punched to its desired shape, it is deburred and rounded top portion 20 is rolled into its final shape having an outwardly rounded radius which will not injure plant life, preferably a radius of approximately one and one-half inches. The remaining walls are cut, deburred, then rolled in a manner similar to first end wall 12. Second end wall 14 has a rounded top portion 22 and a bottom end 32. Front side wall 36 has a rounded top portion 24 and a bottom end 52.

The front side wall 36 also has a hook 60 (not shown) which is welded to its outside face under rounded top portion 24 after rounded top portion 24 is formed. Hook 60 may also be punched, then bent outwards from front side wall 36. Rounded top portion 24 may have first and second holes 70 and 72 near its edges so a nameplate can be hung from first and second holes 70 and 72. Preferably, first and second holes 70 and 72 are 3/16" in diameter and are drilled, plasma cut or punched. Back side wall 38 (not shown) has a rounded top portion 26 (not shown) and a bottom end 54 (not shown), which are similar to those of front side wall 36. Headstone planter 10 has a front side wall 36 connected between first end wall 12 and second end wall 14. A back side wall 38 (not shown) is also connected between first end wall 12 and second end wall 14. Curved bottom 18 is connected to front side wall 36, back side wall 38 (not shown), first end wall 12 and second end wall 14. In the preferred embodiment of this invention, each wall-to-wall interface is continuously welded together along the entire interface and each bottom-to-wall interface is spot welded together approximately every six inches. Curved bottom 18 is curved downward from its center toward first and second end walls 12 and 14 to allow any excess water within headstone planter 10 to run down to the base of first and second end walls 12 and 14 and out of drain holes 62 and 64 (not shown). Curved bottom 18 also allows headstone planter 10 to be set securely atop a variety of differently shaped headstones, without needing any other stabilizing or securing components. The shape of curved bottom 18 is contoured to fit a majority of standard curved top headstones.

Referring now to FIG. 2, there is shown an end view of headstone planter 10 showing a front side wall 36 and a back side wall 38. Back side wall 38 has a rounded top portion 26 and a bottom end 54. Front side wall 36 has a hook 60 welded to or punched from its outside face under rounded top portion 24. Also shown in FIG. 2 is curved bottom 18 with its raised center 17 and its relation to front side wall 36, back side wall 38 and second end wall 14. Bottom end 32 of second end wall 14 is cut prior to assembly so that it has a flat bottom portion 34 and a recessed bottom end portion 33 having a radius of approximately 6 inches. The radius is recessed from flat bottom portion 34 approximately one inch. This shape allows a first notch 46 to be formed where second end wall 14 connects with front side wall 36 and a second notch 48 to be formed where second end wall 14 connects with back side wall 38. Bottom end 30 is similar to that of bottom end 32.

Referring now to FIG. 3, there is shown a top view of headstone planter 10 as seen when looking into the headstone planter from the top. Front and back side walls 36 and 38 and first and second end walls 12 and 14 are connected to form a receptacle for receiving plants and flowers. FIG. 3 reveals the interior of headstone planter 10 formed by front side wall 36, back side wall 38, first end wall 12, and second end wall 14. The preferred embodiment of this invention has drain holes 62 and 64, which are cut in curved bottom 18 prior to assembly, to allow excess water to drain out of headstone planter 10. The rounded top portions 22, 24, 26 and 20 provide a smooth gradual surface for growing plants, allowing such plants to conform to and not be injured by rounded top portions 22, 24, 26 and 20.

What is claimed is:

1. A headstone planter comprising:
   a receptacle having an open top, a curved bottom, a first end wall, a second end wall, a front side wall and a back side wall; said curved bottom being concave toward the inside of said receptacle so as to allow said headstone planter to be securely rested atop various shaped headstones.

2. The headstone planter of claim 1 wherein said curved bottom has first and second end portions, said first and said second end portions each has at least one drain hole.

3. The headstone planter of claim 1 wherein said first end wall and said second end wall each has a top portion and a bottom end, said bottom end having a recessed arc portion, said recessed arc portion having a predetermined radius recessed a predetermined distance from said bottom end.

4. The headstone planter of claim 1 wherein said front side wall and said back side wall each has a concave bottom end.

5. The headstone planter of claim 1 wherein said receptacle is made of metal.

6. The headstone planter of claim 5 wherein said metal has a corrosion-resistant coating.

7. The headstone planter of claim 1 wherein said receptacle is made of plastic.

8. The headstone planter of claim 3 wherein said first end wall and said second end wall further includes a flat bottom portion on each side of said recessed arc portion of said first end wall and said second end wall wherein said bottom end of said first end wall and said bottom end of said second end wall meet at a predetermined distance above a bottom end of said front side wall and a bottom end of said back side wall forming a notch.

9. The headstone planter of claim 1 wherein said front side wall has at least one hook on an exterior surface.

10. The headstone planter of claim 1 wherein said front side wall has a rounded top portion and a bottom end; said rounded top portion having at least two holes for hanging a nameplate on said headstone planter.

11. A headstone planter comprising:
- a first end wall having a concave bottom end and an outwardly rounded top portion;
- a second end wall having a concave bottom end and an outwardly rounded top portion;
- a front wall having a concave bottom end and an outwardly rounded top portion;
- a back wall having a concave bottom end and an outwardly rounded top portion; and
- a curved bottom having a middle portion higher than a first bottom end and a second bottom end, said curved bottom being recessed in said headstone planter.

12. The headstone planter of claim 11 wherein each of said first bottom end and said second bottom end of said curved bottom has at least one opening forming at least one drain hole.

13. The headstone planter of claim 11 wherein said headstone planter is made of metal.

14. The headstone planter of claim 13 wherein said metal has a corrosion-resistant coating.

15. The headstone planter of claim 11 wherein said headstone planter is made of plastic.

16. The headstone planter of claim 11 wherein said front wall has at least one hook on an exterior surface.

17. The headstone planter of claim 11 wherein said outwardly rounded top portion of said front wall has at least two holes for hanging a nameplate on said headstone planter.

* * * * *